(12) United States Patent
Grau et al.

(10) Patent No.: US 11,947,333 B2
(45) Date of Patent: Apr. 2, 2024

(54) DUAL LATTICE REPRESENTATION FOR CRASH SIMULATION AND MANUFACTURING

(71) Applicant: Autodesk, Inc., San Francisco, CA (US)

(72) Inventors: Michael Grau, Birmingham, MI (US); Klaus Gibbe, Gelnhausen (DE)

(73) Assignee: Autodesk, Inc., San Francisco, CA (US)

( * ) Notice: Subject to any disclaimer, the term of this patent is extended or adjusted under 35 U.S.C. 154(b) by 472 days.

(21) Appl. No.: 17/203,524

(22) Filed: Mar. 16, 2021

(65) Prior Publication Data

US 2021/0294300 A1 Sep. 23, 2021

Related U.S. Application Data

(60) Provisional application No. 63/001,966, filed on Mar. 30, 2020, provisional application No. 62/992,841, filed on Mar. 20, 2020.

(51) Int. Cl.
  *G05B 19/4099* (2006.01)
  *G06F 30/10* (2020.01)
  (Continued)

(52) U.S. Cl.
  CPC ......... *G05B 19/4099* (2013.01); *G06F 30/10* (2020.01); *G06F 30/20* (2020.01);
  (Continued)

(58) Field of Classification Search
  CPC ...... G06F 30/20; G06F 2111/10; G06F 30/10; G06F 2111/02; G06F 2113/10;
  (Continued)

(56) References Cited

U.S. PATENT DOCUMENTS 6,704,693 B1   3/2004   Fan et al.
11,295,041 B2  4/2022   Cramer et al.
(Continued)

FOREIGN PATENT DOCUMENTS

WO   WO 2017/186786 A1   11/2017

OTHER PUBLICATIONS

Broekaart, "Simuleon FEA Blog—5 Reasons Why You Should Use a Mid-surface Shell Mesh for Thin-walled Parts," (Sep. 6, 2016) [online] (retrieved from https://info.simuleon.com/blog/5-reasons-why-your-fea-simulations-should-be-setup-with-a-mid-surface-shell-mesh-for-thin-walled-parts), 12 pages.

(Continued)

*Primary Examiner* — Chun Cao
(74) *Attorney, Agent, or Firm* — Fish & Richardson P.C.

(57) ABSTRACT

Methods, systems, and apparatus, including medium-encoded computer program products, for designing and manufacturing physical objects including lattice structures include, in one aspect, a method including: obtaining a skeleton model of a lattice structure, constructing a control point frame surface model using the skeleton model, generating a shell mesh model of the lattice structure using the control point frame surface model, performing numerical simulation of a physical object using the shell mesh model included within a 3D model of the physical object to produce an assessment, modifying the skeleton model or the control point frame surface model based on the assessment to change the lattice structure until it satisfies at least one response requirement, producing from the control point frame surface model a solid body model of the lattice structure hollow beams, and providing at least the solid body model for use in manufacturing a hollow lattice structure.

27 Claims, 6 Drawing Sheets

(51) Int. Cl.
*G06F 30/20* (2020.01)
*G06F 111/10* (2020.01)
*G06F 113/10* (2020.01)

(52) U.S. Cl.
CPC .............. *G05B 2219/34279* (2013.01); *G05B 2219/35134* (2013.01); *G06F 2111/10* (2020.01); *G06F 2113/10* (2020.01)

(58) Field of Classification Search
CPC .. G06F 2113/22; G06F 2119/18; G06F 30/23; G06F 30/27; G05B 19/4099; G05B 19/4207; G05B 2219/34279; G05B 2219/35134; G05B 2219/49008; G06T 17/205; G06T 17/30; G06T 19/20; G06T 2219/2024
USPC .......................................................... 700/98
See application file for complete search history.

(56) References Cited

U.S. PATENT DOCUMENTS

| | | | |
|---|---|---|---|
| 11,449,647 | B2 | 9/2022 | Grau et al. |
| 2009/0024370 | A1 | 1/2009 | Scott et al. |
| 2014/0005986 | A1 | 1/2014 | Aish et al. |
| 2014/0160121 | A1 | 6/2014 | Johansson et al. |
| 2015/0190971 | A1* | 7/2015 | Musuvathy ........... B29C 64/386 700/98 |
| 2017/0372480 | A1 | 12/2017 | Anand et al. |
| 2018/0240263 | A1 | 8/2018 | Courter et al. |
| 2019/0113091 | A1* | 4/2019 | Trivedi ................... B29C 64/40 |
| 2019/0130058 | A1 | 5/2019 | Thomas |
| 2019/0138670 | A1* | 5/2019 | Bandara .................. G06F 30/20 |
| 2019/0366703 | A1* | 12/2019 | Bächer .................. B22F 3/1103 |
| 2020/0074028 | A1 | 3/2020 | Yang et al. |
| 2020/0150623 | A1* | 5/2020 | Bandara ................. B33Y 10/00 |
| 2020/0151286 | A1 | 5/2020 | Willis et al. |
| 2021/0327138 | A1 | 10/2021 | Perry et al. |
| 2021/0331265 | A1 | 10/2021 | Zhang et al. |
| 2021/0331789 | A1 | 10/2021 | Wardlaw |
| 2022/0402038 | A1 | 12/2022 | Tourangeau et al. |

OTHER PUBLICATIONS

Cipriani et al., "3D Models Mapping Optimization Through an Integrated Parameterization Approach: Cases Studies from Ravenna," The International Archives of the Photogrammetry, Remote Sensing and Spatial Information Sciences, vol. XL-5, 2014, ISPRS Technical V Symposium, Jun. 23-25, 2014, Riva del Garda, Italy, 8 pages.

Muelaner, "3D CAD World—Implicit Modelling for Complex Geometry," (Feb. 3, 2020) [online] (retrieved from https://www.3dcadworld.com/implicit-modelling-for-complex-geometry/), 23 pages.

Pura, "Hexagon MSC Software—Introduction: Midsurface Geometry and Meshing for FEA with MSC Apex," (Jun. 4, 2019) [online] (retrieved from https://simulatemore.mscsoftware.com/introduction-midsurface-geometry-and-meshing-for-fea-with-msc-apex/), 4 pages.

Schertler et al., "Generalized Motorcycle Graphs for Imperfect Quad-dominant Meshes," ACM Transactions on Graphics 37, 4, Article 155 (Aug. 2018), 16 pages.

Tourangeau et al., U.S. Appl. No. 62/937,156, "Volumetric Kernel Representation of Three Dimensional Models," filed Nov. 18, 2019, 23 pages.

Autodesk.com [online], "Generative Design," available on or before Jul. 2016, retrieved on Jan. 2020, retrieved from URL<https://www.autodesk.com/solutions/generative-design>, 2 pages.

Notice of Allowance in U.S. Appl. No. 16/747,816, dated Apr. 26, 2022, 8 pages.

Office Action in U.S. Appl. No. 16/747,816, dated Nov. 8, 2021, 14 pages.

Office Action in U.S. Appl. No. 17/933,701, dated Oct. 4, 2023, 14 pages.

Response to Non-Final Rejection for U.S. Appl. No. 16/747,816, submitted on Feb. 8, 2022, 13 pages.

Sheen et al., "Transformation of a thin-walled solid model into a surface model via solid deflation," Computer-Aided Design, Aug. 2010, 42(8):720-730.

Tang et al., "Bidirectional Evolutionary Structural Optimization (BESO) based design method for lattice structure to be fabricated by additive manufacturing," Computer-Aided Design, Dec. 2015, 69:91-101.

Wikipedia.org [online], "3D printing," available on or before Nov. 2005, retrieved on Jan. 2020, retrieved from URL<https://en.wikipedia.org/wiki/3D_printing>, 16 pages.

Wikipedia.org [online], "Crash simulation," available on or before Sep. 2006, retrieved on Jan. 2020, retrieved from URL<https://en.wikipedia.org/wiki/Crash_simulation>, 5 pages.

Wikipedia.org [online], "Design for additive manufacturing," available on or before Nov. 2016, retrieved on Jan. 2020, retrieved from URL<https://en.wikipedia.org/wiki/Design_for_additive_manufacturing>, 3 pages.

* cited by examiner

DUAL LATTICE REPRESENTATION FOR CRASH SIMULATION AND MANUFACTURING

CROSS-REFERENCE TO RELATED APPLICATIONS

This application claims the benefit under 35 U.S.C. § 119(e) of U.S. Patent Application No. 62/992,841, filed Mar. 20, 2020, and U.S. Patent Application No. 63/001,966, filed Mar. 30, 2020, each entitled "DUAL LATTICE REPRESENTATION FOR CRASH SIMULATION AND MANUFACTURING".

BACKGROUND

This specification relates to computer aided design and engineering of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

Some CAD software has included tools that facilitate 3D geometry enhancements using lattices and skins of various sizes, thicknesses and densities, where lattices are composed of beams or struts that are connected to each other at junctions, and skins are shell structures that overlay or encapsulate the lattices. Such tools allow redesign of a 3D part to be lighter in weight, while still maintaining desired performance characteristics (e.g., stiffness and flexibility). Such software tools have used lattice topologies of various types that can be used to generate lattice structures that can be manufactured.

SUMMARY

This specification describes technologies relating to computer aided design and manufacture of physical objects including lattice structures, and in particular to using three dimensional (3D) modeling, simulation programs (e.g., dynamic crash simulation of a complex component in an assembly model), and additive manufacturing to design and manufacture lattice structures, e.g., within vehicle components or within American football helmets.

Particular embodiments of the subject matter described in this specification can be implemented to realize one or more of the following advantages. A dual representation of a lattice structure can facilitate the design and manufacture of a physical object including that lattice structure by enabling full crash simulation of the physical response of the object during a dynamic event, such as a car crash or a helmet-to-helmet impact during an American football play. A first aspect of the dual representation enables the lattice structure to be readily redesigned (by a user and/or by the software during a generative design process) within a CAD program, with full B-Rep models being readily generable within the CAD program as needed. The dual representation can include T-Splines, and the dual representation can be exposed to the user through tool(s) that connect workflows with parametric design methodologies. For example, a B-Rep lattice and it's FEA twin can be designed with parametric values, and an automated workflow can offload the generative design process to the cloud.

In addition, a second aspect of the dual representation enables dynamic and accurate numerical simulation of the lattice behavior during crashes, i.e., not simply a static, numerical simulation of deformation under a set of one or more loads. This second aspect of the dual representation can be an FEA representation that conforms with industry standard FEA assembly modeling techniques, which supports dynamic simulation of the performance characteristics of the lattice structures and enables improved design and simulation performance while reducing the needed computational work, which is of particular value when simulating the physical response of a modelled assembly. For example, an organic hollow T-Spline lattice can readily produce a per-shell-element representation for computationally light FEA models, and note that both implicit (linear static) and explicit (dynamic crash) solvers can benefit from the FEA modelling described since it improves computational performance. This can substantially reduce the total time needed in a design cycle to produce a manufacturable object that will achieve the desired performance under real world impact events. Organic hollow lattices can be produced using two linked models (a dual model) that provide both a 3D printable design and an associated Computer Aided Engineering (CAE) design that meets industry standards for crash simulation.

Thus, this approach provides a version of the lattice model that readily interfaces with standard industry solvers for FEA simulation modelling, while also being readily usable in a CAD program, both for modelling functions and for preparation for additive manufacturing. Assembly simulation and lattice optimization are facilitated, and one model (having dual representations) is usable as a simulation model for a variety of different solvers (implicit and explicit). Thus, this lattice modelling technique can facilitate lattice design in multiple application areas, including for structural components with elastic-plastic material characterization (static and dynamic) where designs can be internal support for build and enhanced stiffness may be required, for energy absorbing structures with hyperplastic materials characterization (dynamic) where designs are meant to absorb and emit energy and complements with a damping effect, for energy absorbing structures with elastic-plastic material characterization (dynamic) where designs are meant to absorb energy by deformation dependent on strain-energy, and for forced convection and natural convection in fluid structure interaction (static and transient fluid) where designs are meant to dissipate heat or radiate, such as for catalytic reactor design (e.g., employing hollow-lattice(s) to improve heat transfer in hydrogen catalytic reactors). Lattice optimization can be done within an assembly model simulation, and more solutions to the problem can be explored by running a lattice and skin optimization on the individual components. Finally, the systems and techniques described in this specification are readily usable in the manufacturing industry, and other applications including use in architecture for creating organic structures (e.g., housing, drainage, flood prevention), additive concrete printing of structures, design and artistic applications, medical applications like hip replacement, and agricultural applications, e.g., for plant growth as an underlying water distribution chamber.

In general, one or more aspects of the subject matter described in this specification can be embodied in one or more methods (and also one or more non-transitory computer-readable mediums tangibly encoding a computer program operable to cause data processing apparatus to perform operations) including: obtaining a skeleton model of a lattice structure to be included in a three dimensional model of a physical object to be manufactured, the skeleton model including nodes and lines representing beams of the lattice structure; constructing a control point frame surface model of the lattice structure using the skeleton model; generating a shell mesh model of the lattice structure using the control point frame surface model, where the shell mesh model corresponds to hollow versions of the beams of the lattice structure; performing dynamic numerical simulation of the physical object, using the shell mesh model included within the three dimensional model of the physical object, to produce a current numerical assessment; modifying the skeleton model or the control point frame surface model based on the current numerical assessment to change the lattice structure; repeating the constructing, the generating and the performing, or the generating and the performing, one or more times until the numerical simulation indicates the lattice structure satisfies at least one impact response requirement for the physical object; producing from the control point frame surface model a solid body model of the lattice structure in which the beams are hollow; and providing at least the solid body model for use in manufacturing a hollow lattice structure, which corresponds to the solid body model, for the physical object using one or more computer-controlled manufacturing systems. These and other embodiments can optionally include one or more of the following features.

The generating can include generating a midsurface shell mesh model of the lattice structure using the control point frame surface model and a specified thickness for the hollow versions of the beams of the lattice structure, the performing can include performing the dynamic numerical simulation using the midsurface shell mesh model, and the producing can include producing the solid body model of the lattice structure in which the beams are hollow and have the specified thickness.

The generating can include generating a low poly quad dominant shell mesh model of the lattice structure using the control point frame surface model, and the performing can include performing the dynamic numerical simulation using the low poly quad dominant shell mesh model and empirical data indicating correlation between the low poly quad dominant shell mesh model of the lattice structure and the solid body model of the lattice structure. The empirical data can be selected from a database of correlations in accordance with one or more properties of the lattice structure, where the correlations are of actual-to-simulated physical responses determined empirically for different lattice properties including lattice beam diameter, lattice thickness, lattice material, lattice cell size, lattice volume fraction, and lattice deformation.

Obtaining the skeleton model can include: calling a lattice design tool; and receiving in, or producing from, output of the lattice design tool the nodes and the lines representing the beams of the lattice structure. The lattice design tool can include a lattice optimization tool that determines one or more lattice characteristics based on static numerical simulation of a lattice component under one or more predefined loads, and the one or more lattice characteristics can include lattice topology, lattice orientation, lattice cell size, lattice volume fraction, or a combination thereof.

The skeleton model of the lattice structure can further include thickness values and gradient values for the beams represented by the lines. The control point frame surface model can include a T-Spline model of the lattice structure (a control point grid can underlie, and be used to produce, a T-Spline). Moreover, the one or more computer-controlled manufacturing systems can include one or more computer-controlled additive manufacturing systems, and the providing can include: generating toolpath specifications for the one or more computer-controlled additive manufacturing systems using at least the solid body model; and manufacturing at least the lattice structure with the one or more computer-controlled additive manufacturing systems using the toolpath specifications generated for the one or more computer-controlled additive manufacturing systems.

One or more aspects of the subject matter described in this specification can also be embodied in a system including: a non-transitory storage medium having instructions of a computer aided design program stored thereon; and one or more data processing apparatus able to run the instructions of the computer aided design program to perform operations specified by the instructions of the computer aided design program to perform operations of any of the methods described in this document. Further, the system can include the one or more computer-controlled manufacturing systems including one or more computer-controlled additive manufacturing systems, where the one or more data processing apparatus are able to run the instructions of the computer aided design program to generate toolpath specifications for the one or more computer-controlled additive manufacturing systems using at least the solid body model, and to manufacture at least the lattice structure with the one or more computer-controlled additive manufacturing systems using the toolpath specifications generated for the one or more computer-controlled additive manufacturing systems.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
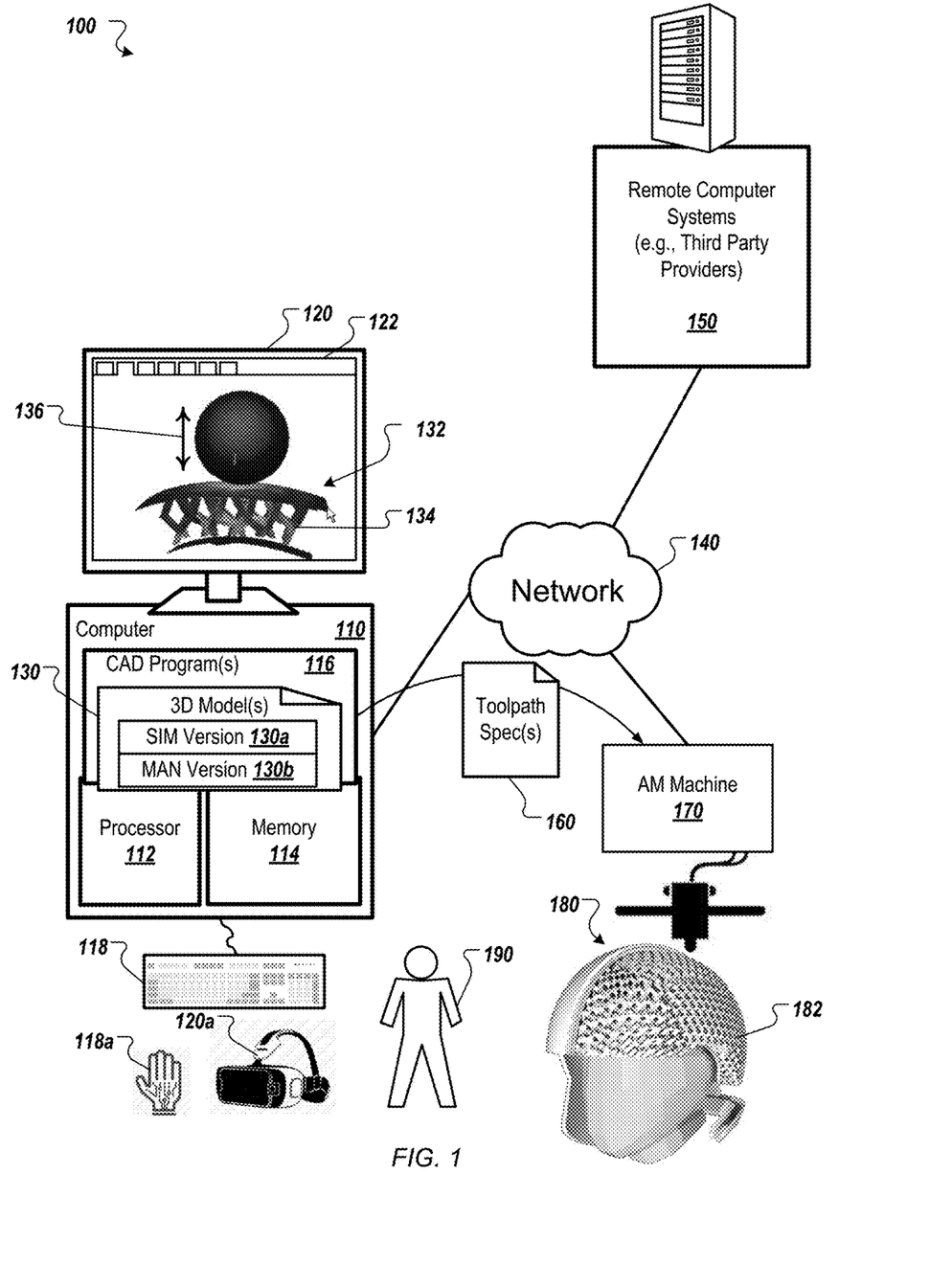
FIG. 1 shows an example of a system usable to design and manufacture lattice structures in physical objects, such as vehicle components or portions of helmets for people.

FIG. 1 shows an example of a system 100 usable to design and manufacture lattice structures for physical objects. In the example shown, an additive manufacturing machine is used, but the invention is not limited to use with a particular type of manufacturing system. For example, the systems and techniques described herein can be used with various types of additive manufacturing (AM), often referred to as three dimensional (3D) printing, subtractive manufacturing (SM), investment casting, etc.

A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and numerical simulation, as described throughout this document.

The CAD program(s) 116 can also include one or more generative design processes for topology optimization using numerical simulation, including potentially material or microstructure shape optimization techniques, geometrical or macrostructure shape optimization techniques, or both (e.g., using one or more level-set based topology optimization processes). The numerical simulation performed by the CAD program(s) 116 can simulate one or more physical properties and can use one or more types of simulation to produce a numerical assessment of physical response (e.g., structural response) of the modelled object. For example, finite element analysis (FEA), including linear static FEA, finite difference method(s), and material point method(s) can be used. Further, the simulation of physical properties performed by the CAD program(s) 116 can include Computational Fluid Dynamics (CFD), Acoustics/Noise Control, thermal conduction, computational injection molding, electric or electro-magnetic flux, and/or material solidification (which is useful for phase changes in molding processes) simulations.

As used herein, "CAD program" refers to any suitable program used to design physical structures that meet design requirements, regardless of whether or not the CAD program is capable of interfacing with and/or controlling manufacturing equipment. Thus, CAD program(s) 116 can include Computer Aided Engineering (CAE) program(s), Computer Aided Manufacturing (CAM) program(s), etc. The CAD program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or numerical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118a and/or a VR/AR headset 120a.

A user 190 can interact with the CAD program(s) 116 to create and/or load 3D model(s) 132 (e.g., of a helmet for a person). This can be done using known graphical user interface tools. The 3D model can be defined in the computer using various known 3D modeling formats, such as using solid models (e.g., voxels) or surface models (e.g., B-Rep (Boundary Representation), surface meshes). The user 190 can also operate the system 100 to modify the 3D model 132 by adding and adjusting a lattice structure model 134, as described in detail below. In addition, the user 190 can interact with the CAD program(s) 116 to simulate the impact of an object with the 3D model 132 including the lattice structure model 134, which can be stored in 3D model document(s) 130.

The lattice structure model 134 is saved (in volatile memory and/or persistent storage) in a format that provides dual representation of the lattice structure. A first version 130a of the lattice structure model 134 is used for simulation (SIM). The first version 130a of the lattice structure is a shell mesh model, and the simulation that is performed with this shell mesh model is explicit crash simulation, in which a dynamic impact 136 simulation is performed. In the example shown, the lattice structure model 134 is used to improve the structural response of a helmet 180 (with a manufactured, physical version 182 of the lattice structure 134 included therein) under defined impact conditions (e.g., a solid sphere crashing into and then rebounding 136 from the model 132 of the physical object). But as will be appreciated, many different types of physical objects can be modelled and tested under simulated impact conditions.

The dynamic impact conditions for this numerical simulation can be defined by the user 190 interacting with the CAD program(s) 116 and/or loaded from another process or computer. In addition, static numerical simulation can also be performed by the CAD program(s) 116, such as to optimize the lattice characteristics of the lattice structure 134 and/or to generatively design one or more portions of the model 132. Thus, the CAD program(s) 116 can be programmed to allow the user 190 to define a mechanical problem for static numerical simulation (e.g., linear static FEA) as well as for dynamic numerical simulation (e.g., car crash simulation). Moreover, the lattice structure model 134 can be modified repeatedly as a result of the dynamic impact simulation, as described in further detail below in connection with FIG. 2.

Once the user 190 is satisfied with the 3D model 132, a second version 130b of the lattice structure model 134 is used for manufacturing (MAN) physical version 182 of the lattice structure 134. The second version 130b of the lattice structure is a solid body model of the lattice structure in which the beams of the lattice are hollow. Note that the use of hollow lattice beams is advantageous, as described herein, at least because it improves the structural performance of the lattice in relation to material usage in 3D printing the lattice 182 while at the same time improving the accuracy of the simulation using the shell mesh model version 130a of the lattice structure. The solid body version 130b of the lattice structure can be used to generate another representation of the lattice model for manufacturing purposes (e.g., an .STL file for additive manufacturing).

This can be done upon request by the user 190, or in light of the user's request for another action, such as sending the 3D model 132 and/or the lattice model 134 to an additive manufacturing (AM) machine 170, or other manufacturing machinery, which can be directly connected to the computer 110, or connected via a network 140, as shown. This can involve a post-process carried out on the local computer 110 or a cloud service to export the 3D model 132 and/or the lattice model 134 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 160 (having toolpath specifications of an appropriate format) to the AM machine 170 to produce a physical lattice structure 182 having lattice properties that provide desired impact response requirement(s) for the physical object 180, e.g., a helmet 180. The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). Additional manufacturing systems and methods can be used as well. In some implementations, the lattice structures (e.g., created as B-Reps) can be made out of formed and welded sheet metal (e.g., using one or more CNC machines). In addition, the user 190 can save or transmit the 3D model for later use. For example, the CAD program(s) 116 can store the document 130 that includes the generated 3D model.

Figure 2:
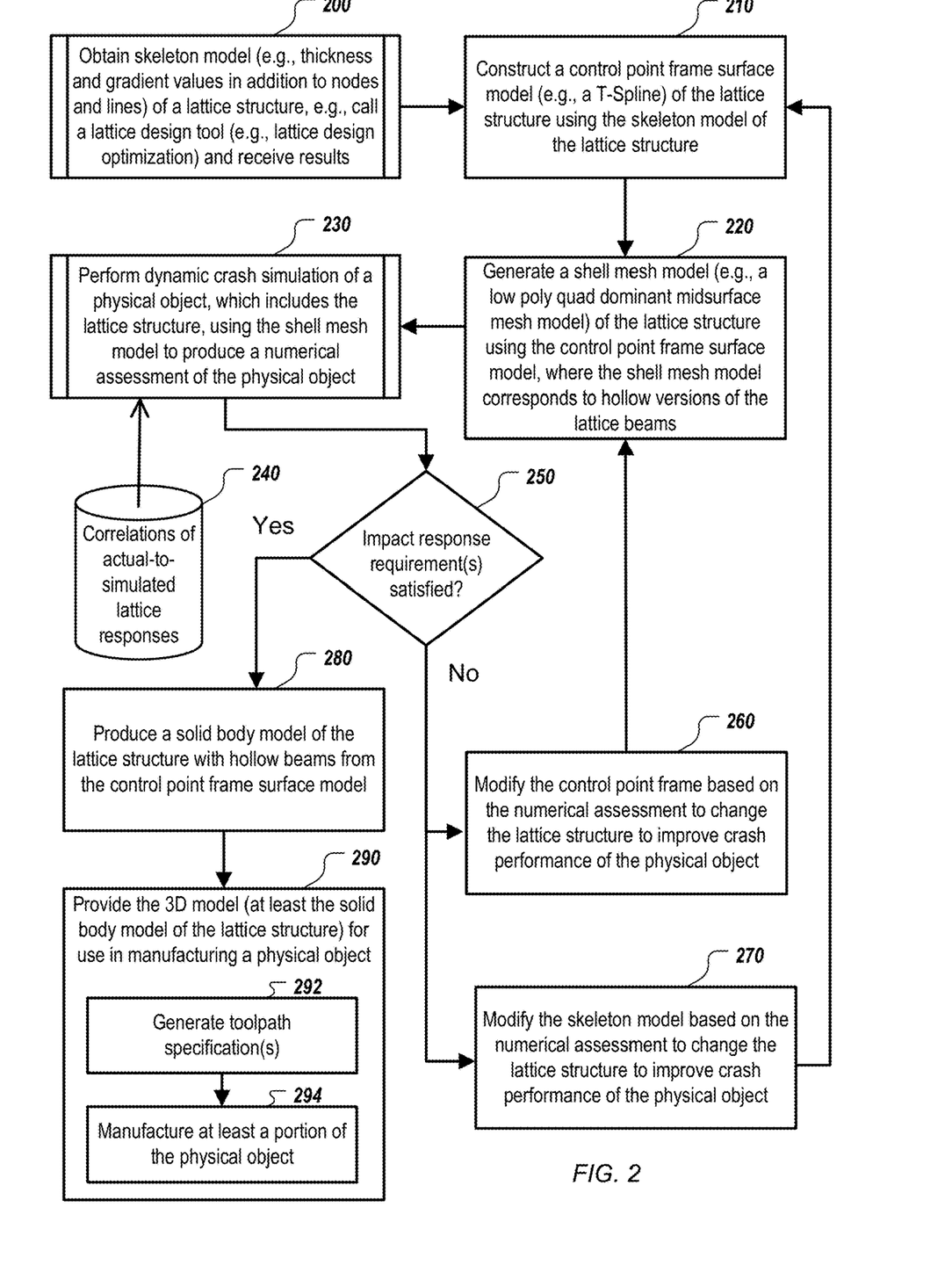
FIG. 2 shows an example of a process to design and manufacture lattice structures for physical objects, such as vehicle components or portions of helmets for people.
Figure 3A:
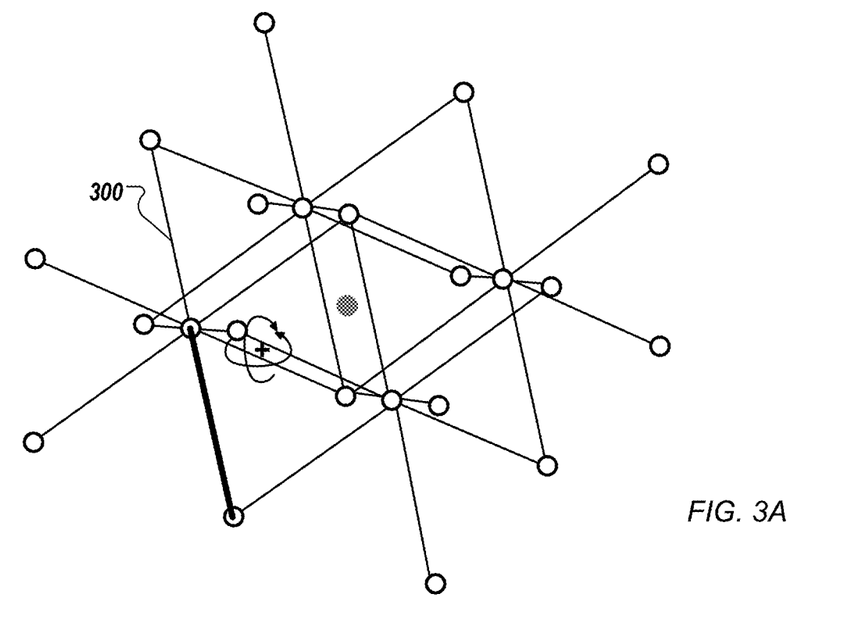
FIG. 3A shows an example of a skeleton model of a lattice structure.

FIG. 2 shows an example of a process to design and manufacture lattice structures for physical objects. A skeleton model is obtained 200, e.g., by CAD program(s) 116. This can include loading a predefined skeleton model and/or producing a skeleton model for the current design project. In some implementations, a 3D sketch of the lattice is produced and displayed to the user. The 3D sketch of the lattice can be produced in response to user input to the UI 122 in the CAD program(s) 116. FIG. 3A shows an example of a skeleton model 300 of a lattice structure, as can be presented in the UI 122. However, in some implementations, the skeleton model of the lattice structure need not be shown to the user. In some implementations, the skeleton model is created 200 by a scripting program, e.g., a visual basic script, or another algorithm that works in or with the CAD program(s) 116. For example, a program, such as a computational structural simulation (CSS) program, e.g., NETFABB® software, available from Autodesk, Inc., of San Rafael, Calif., can interface with or be integrated into the CAD program(s) 116 and be used to create lattice nodes and lines sketches that conform to a complex surface, e.g., the interior shape of a helmet. These nodes and lines that represent the initial lattice can be exported from such program(s) to a CSV (Comma Separated Values) file that is then read 200.

As another example, the obtaining 200 can include calling a lattice design tool, and receiving in (or producing from) output of the lattice design tool the nodes and the lines representing the beams of the lattice structure. In some implementations, the obtaining 200 involves receiving output of a lattice design tool that uses the systems and techniques described in U.S. Provisional Patent Application No. 62/937,156, filed on Nov. 18, 2019, and PCT Application No. PCT/US2020/061083, filed on Nov. 18, 2020, published as PCT Publication No. WO 2021/102018 on May 27, 2021, and both titled, "VOLUMETRIC KERNEL REPRESENTATION OF THREE DIMENSIONAL MODELS". In some implementations, the lattice design tool is a lattice optimization tool that determines one or more lattice characteristics based on static numerical simulation of a lattice component under one or more predefined loads. The one or more lattice characteristics can include lattice topology, lattice orientation, lattice cell size, lattice volume fraction, or a combination thereof. In some implementations, the obtaining 200 involves receiving output of a lattice design tool that uses the systems and techniques described in PCT Publication No. WO 2017/186786 A1, filed 26 Apr. 2017, titled "METHOD AND SYSTEM FOR GENERATING LATTICE RECOMMENDATIONS IN COMPUTER AIDED DESIGN APPLICATIONS". Moreover, the skeleton model of the lattice structure can include thickness values, which specify different lattice beam diameters and/or different lattice beam internal hollows sizes, as well as potentially gradient values for the beams represented by the lines of the skeleton model.

In any case, the skeleton model is of the lattice structure that is to be included in a three dimensional model of a physical object to be manufactured. Thus, the skeleton model includes nodes and lines representing beams of the lattice structure. A control point frame surface model of the lattice structure is constructed 210, e.g., by CAD program(s) 116, using the skeleton model of the lattice structure. The control point frame surface model can be one or more T-Splines, one or more Non-Uniform Rational Basis Splines (NURBS) or other 3D model formats that produce a limit surface from a set of control points, which is often specified as a quad mesh. Note that a T-Spline model of the lattice structure will have fewer control points than a NURB and is thus often more suitable for modeling complex organic shapes in CAD programs.

Figure 3B:
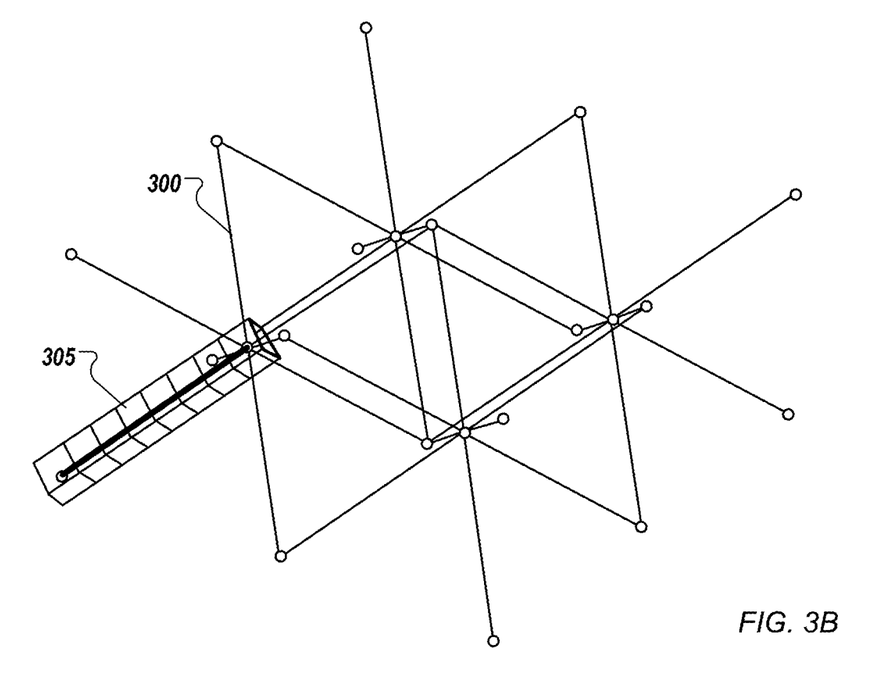
FIG. 3B shows an example of a T-Spline control point frame for one lattice beam line in the skeleton model of FIG. 3A.
Figures 3C, 3D, 3E:
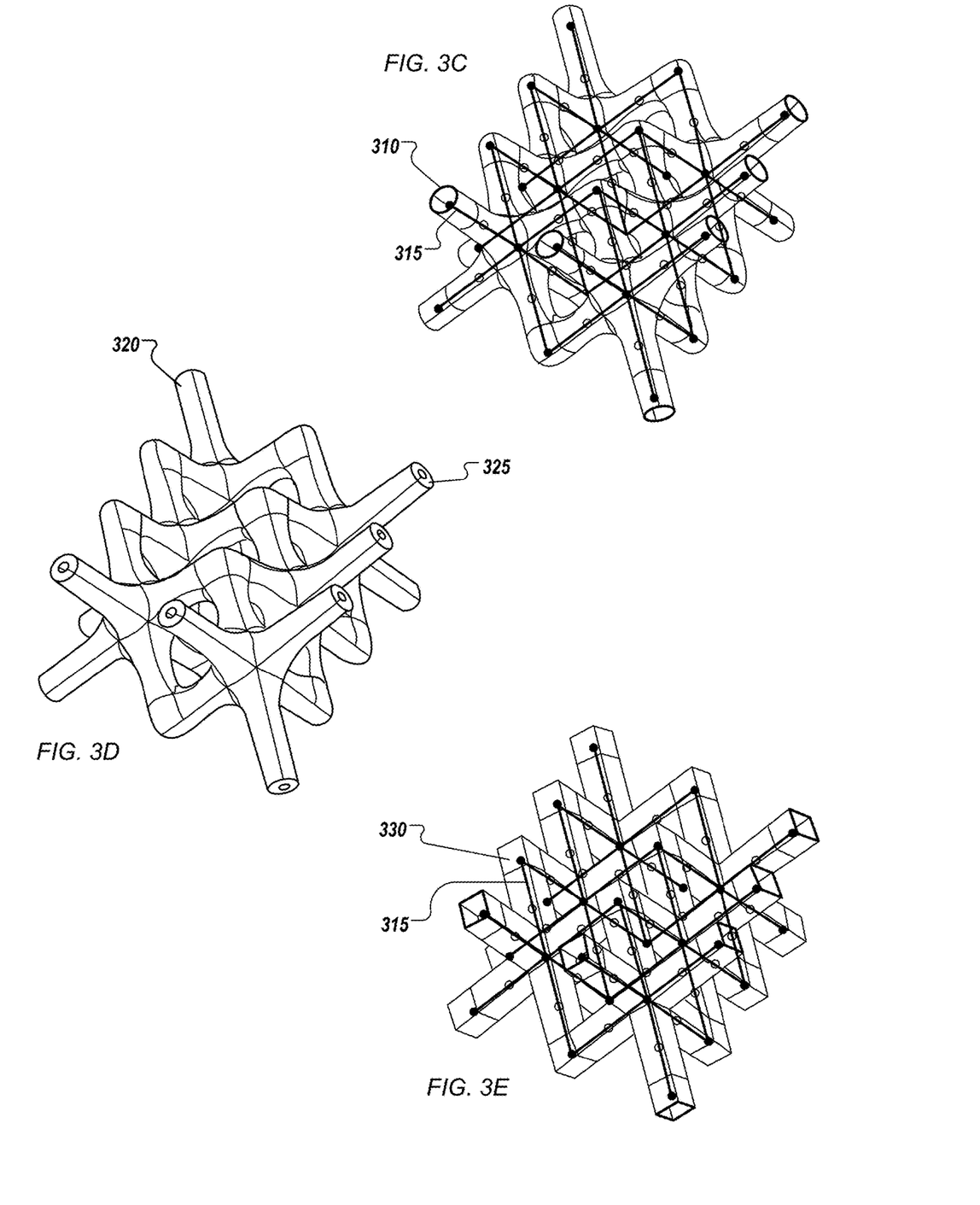
FIG. 3C shows an organic limit surface produced from a T-Spline model constructed from a skeleton model.
FIG. 3D shows a hollow lattice structure produced from the T-Spline model constructed from the skeleton model of FIG. 3C.
FIG. 3E shows a low poly quad dominant shell mesh model produced from the T-Spline model constructed from the skeleton model of FIG. 3C.

Constructing 210 the control point frame surface model from the skeleton model of the lattice structure can be done in a manner similar to how a low poly quad dominant mesh is produced around a skeleton graph. In some implementations, the CAD program(s) 116 include a T-Spline library to create quad control faces of a T-Spline, preferably with a low number of quad faces. For example, FIG. 3B shows an example of a T-Spline control point frame 305 for one lattice beam line in the skeleton model 300 of FIG. 3A. Note that the density (number) of quads in the control point frame 305 can be readily changed, and the constructed 210 control can be for the entirety of the skeleton model. FIG. 3C shows an organic limit surface 310 produced from a T-Spline model constructed 210 from a skeleton model 315.

In addition, a shell mesh model of the lattice structure is generated 220, e.g., by CAD program(s) 116, using the control point frame surface model (e.g., the T-Spline model) where the shell mesh model corresponds to hollow versions of the lattice beams. In some implementations, this involves generating a midsurface shell mesh model of the lattice structure using the control point frame surface model and a specified thickness for the hollow versions of the beams of the lattice structure. FIG. 3D shows a hollow lattice structure 320 produced from the T-Spline model constructed from the skeleton model 315. As shown, the limit surface has been given a thickness 325 set by the specified thickness for the hollow versions of the beams of the lattice structure; note that each beam of the lattice is hollow. The midsurface shell mesh model of the lattice structure is composed of midsurfaces of these thin walled, hollow beams of the lattice structure.

Further, in some implementations, the generating 220 involves generating 220, e.g., by CAD program(s) 116, a low poly quad dominant shell mesh model. This mesh model is "quad dominant" in that most of the polygons are quads rather than triangles, and this mesh model is "low poly" in that the total number of polygons of the mesh model is small as compared to the number of polygons that would be created for a typical mesh model of the limit (outer) surface or the midsurface produced from the control point frame surface model. For example, FIG. 3E shows a low poly quad dominant shell mesh model 330 produced from the T-Spline model constructed from the skeleton model 315. As shown, this is a simplified version of the lattice structure in which relatively large quad elements are used to mesh the body for simulation. Note that this facilitates the dynamic numerical simulation of an impact event by limiting the number of surface elements included in the simulation model to tens of thousands, rather than the hundreds of thousands of surface elements (needed to match the curvature of the organic body) in a typical midsurface shell mesh model of the hollow lattice structure. In some implementations, the generating 220 involves generating 220, e.g., by CAD program(s) 116, a low poly quad dominant midsurface shell mesh model. In some implementations, the number of polygons for a low poly quad dominant shell mesh model is set based on the processing resources available for running simulation and how quickly the simulation needs to be done.

Dynamic crash simulation of a physical object, which includes the lattice structure, is performed using numerical simulation 230 using the shell mesh model to produce a numerical assessment of the physical object. Note that this simulation 230 can be actual, dynamic impact simulation, not simply static analysis showing deformation from an applied load. In addition, this dynamic numerical simulation 230 is of the larger physical object with the lattice structure included therein. Thus, this simulation 230 constitutes validation of the assembly based on the lattice component included within the assembly, whether it is a car, a helmet, or some other physical object being modelled. For example, the described systems and techniques can be applied to a catalytic reactor (e.g., a hydrogen catalytic reactor) to solve heat transfer problem(s). Note that a variety of applications for the hollow-lattices technologies described this specification are possible.

Further, in some implementations, the numerical simulation 230 is performed using the midsurface shell mesh model. The midsurface shell mesh model is a good representation of the hollow lattice for purposes of dynamic numerical simulation, and because the midsurface shell mesh model will typically have hundreds of thousands of elements, rather than the millions of elements that would be created by a solid body finite element model, the dynamic numerical simulation can actually be performed in a commercially reasonable amount of time given typically available processing resources. For example, if one attempted to use a traditional STL (a common 3D printing format) mesh to run a simulation, the numerical simulation process could not (as a practical matter) actually work given how small the timestep would need to be to simulate the dynamic response of the millions of small 3D elements defined by the STL mesh.

In some implementations, the numerical simulation 230 is performed using the low poly quad dominant shell mesh model. In this case, the simulation 230 can be performed even faster but is not expected to be as accurate with respect to the real world crash performance of the physical object with the lattice therein. Thus, to account for this difference, the simulation 230 can use empirical data indicating correlation between the low poly quad dominant shell mesh model of the lattice structure and the solid body model of the lattice structure. This data correlates the actual physical response of the model to be manufactured with the simulated physical response of the model used in assembly validation.

For example, the empirical data for simulation 230 can be selected from a database 240 of correlations in accordance with one or more properties of the lattice structure. The correlations are of actual-to-simulated physical responses, which can be determined empirically for different lattice properties by manufacturing physical hollow lattices with different lattice properties and empirically testing their physical response in the real world (3D print specimens and figure out a correlative value). The different lattice properties can include lattice beam diameter, lattice thickness (the difference between the inner surface diameter and the outer surface diameter of the hollow beam), lattice material, lattice cell size, lattice volume fraction, and lattice deformation. Note that the lattice design cycle can include deformation of a base lattice structure, both initially to conform to an existing 3D model of the physical object, and responsive the results of simulation 230. Thus, the empirically gathered data can include morphed/deformed versions of the lattices, and the selection from the database 240 can be based on how much deformation has been done at what radii.

In order to correlate between the simplified CAE simulation model, CAD model and additive manufactured part, some implementations employ the following systems and techniques. A database is created that compares load and displacement of multiple lattice configurations. Test specimens are designed and simulated and then physically tested for quasi-static and dynamic behavior, e.g.: organic T-Spline Lattice in solid-tet mesh and shell tria mesh, simplified rectangular beam T-Spline lattice in shell tria and quad mesh, and physical test types of specimen are tensile, compression, shear and torsion. The parameters can include cell size, aspect ratio, beam diameter, thickness of hollow beam, and cube specimen dimension. The multi material specimens can include aluminum, stainless steel, copper, titanium, nylon (polymide) PA6/11/12, and EPU (elastomeric polyurethane)/TPU (thermoplastic polyurethane). Finally, analyzing the data will create a correlation factor between the physical object and the simplified rectangular SIM model.

However, regardless of how many variations of lattice properties are included in the database 240, a set of correlations between a manufactured structure and the simplified representation is fed into the simulation 230 by increasing or decreasing the stiffness/strength of the simplified body (e.g., the low poly quad dominant shell mesh model). For example, the Young's Modulus value used in the simulation 230 can be modified based on the empirical data. And regardless of whether a low poly quad dominant shell mesh model or a midsurface shell mesh model is used, because a shell model of the lattice is used rather than one dimensional representations of the lattice beams, the simulation 230 can be more accurate to the real world physical structure because shell elements can have a global and self-contact model applied with a coefficient of friction; the friction coefficient can be applied to shell elements during simulation 230 when the shell elements come into contact with each other. In contrast, one dimensional beam elements generally cannot have a sophisticated contact model applied to them, and so the margin of error is increased. Moreover, shell element representation results in a larger minimum element edge length thus leading to increased timestep (during simulation) and thus decreased simulation run time and less mass scaling.

For small lattice elements, the shell elements will still be a fairly accurate representation. Consider a beam with a diameter of 2 mm, where the shell model uses a shell thickness of 0.9 mm. This is not enough of a difference that it really matters for the inertia of that section size. The outer diameter contributes the essential amount of inertia to the beam, but that is not all. There is also compression, bending, torsion, and one might lose more here, e.g., area that can take on load for compression simulation is lost. But again, these can be handled by empirically testing the correlation. The information is gathered through experiment, and then the gathered data (e.g., for bending, failed geometry, missing compression or tension area) is converted and put it into the correlation factor.

Further, regardless of whether a low poly quad dominant shell mesh model and/or a midsurface shell mesh model is used, small element edge lengths should be used to reduce simulation time. Note that if one has a single element that has a 1 mm edge length, that element determines the time step for crash simulation, even though all the other elements have 5 mm edge lengths. Currently, the industry can handle 1 mm edge lengths or sometimes 0.5 mm edge lengths. In ten years, it may be possible to run 0.25 mm edge length and have simulation time still be about 8 hours. And note that this can involve running multiple dynamic load cases, e.g., crash the car on the side, crash the car from the roof, etc. Thus, in some implementations, the minimum edge length of a beam is 1 mm or 0.5 mm (if minimum beam length is 0.5 mm, then the diameter of the beam will be about 1 mm, and note that any beam which is less than 1 mm in diameter would effectively become solid anyway). Thus, numerical simulation of physical response of lattice structure can be run in much less time, where the simulation is actually accurate with respect to a physical object that will be constructed from a corresponding CAD boundary representation of the lattice structure.

A check 250 can be made to determine whether or not one or more impact response requirements have been satisfied by the current version of the lattice structure within the 3D model of the physical object. If not, a modification is made to change the lattice structure to improve crash performance of the physical object. This modification can be modification 260, e.g., by CAD program(s) 116, of the control point frame based on the numerical assessment, modification 270 of the skeleton model based on the numerical assessment, or both. The modification 260, 270 can be done at least in part in response to user input. The modifying 260, 270 can be based on implicit and/or explicit solver results from the simulation 230. For example, some lattice sections may have failed, so lattice component optimization can be redone, such as by calling the lattice design tool again with changed load case(s) as input. Other changes are possible as well, such as changing the specified thickness for the hollow versions of the beams of the lattice structure.

Depending on where the modifications are made, the constructing 210, the generating 220 and the performing 230, or the generating 220 and the performing 230, are repeated one or more times until the numerical simulation 230 indicates the lattice structure satisfies at least one impact response requirement for the physical object. Once the assembly simulation validates the lattice structure design, a solid body model of the lattice structure (with hollow beams) is produced 280 from the control point frame surface model. For example, see the hollow lattice structure 320 of FIG. 3D, which can be used as the solid body model from which a suitable manufacturing machine control program/file is produced.

At least the solid body model of the lattice structure (and potentially also the 3D model of the larger assembly) is provided 290 for use in manufacturing the lattice component of the physical object (and potentially the entire physical object). The providing 290 can involve sending or saving the solid body model of the lattice structure (and potentially also the 3D model) to a permanent storage device for use in manufacturing the lattice structure using one or more computer-controlled manufacturing systems. In some implementations, the providing 290 involves generating 292, e.g., by CAD program(s) 116, toolpath specifications for the computer-controlled manufacturing system(s) using the solid body model of the lattice structure (and potentially also the 3D model of the larger assembly), and manufacturing 294, e.g., by CAD program(s) 116, at least lattice structure with the computer-controlled manufacturing system(s) using the toolpath specifications generated for the computer-controlled manufacturing system(s), e.g., an additive manufacturing machine.

Figure 4:
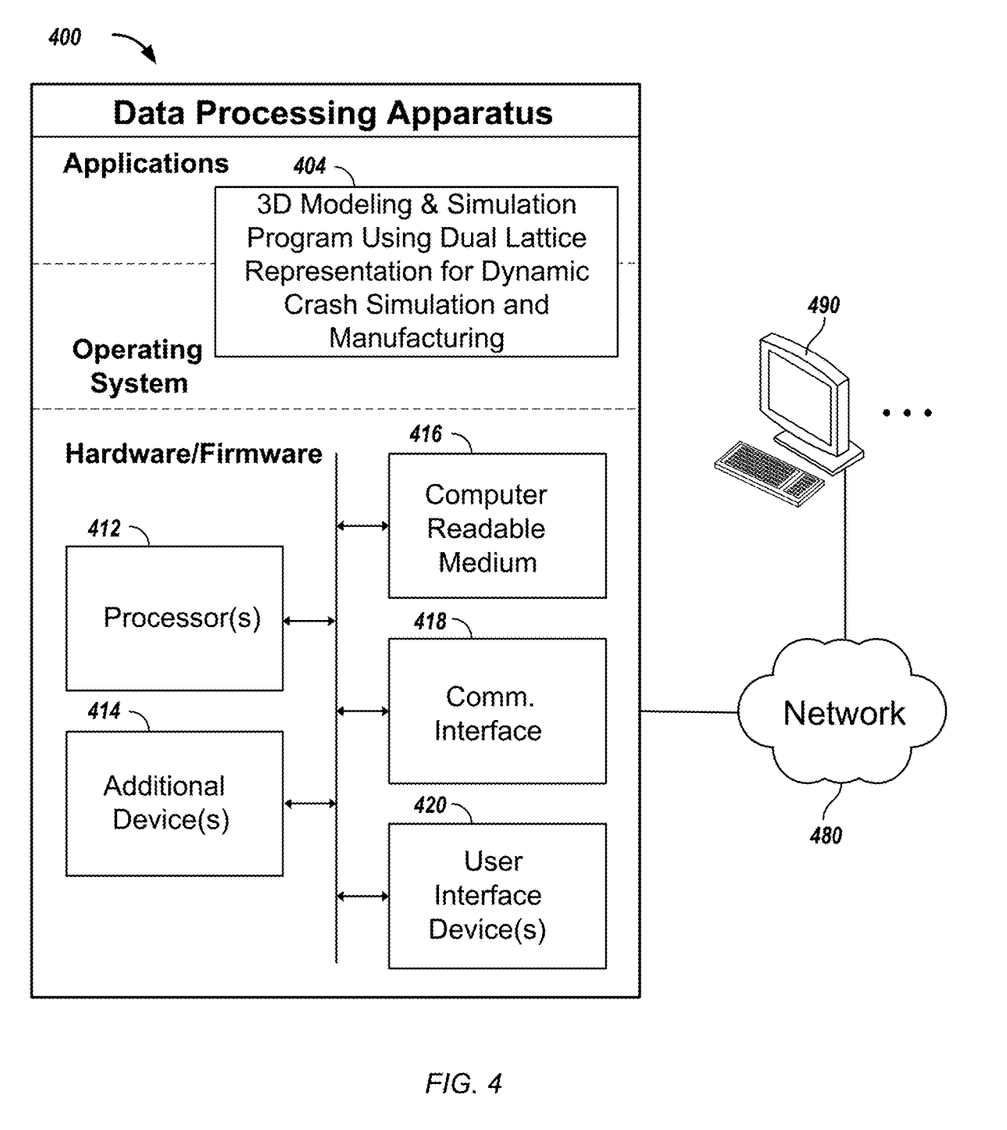
FIG. 4 is a schematic diagram of a data processing system usable to implement the described systems and techniques.

FIG. 4 is a schematic diagram of a data processing system including a data processing apparatus 400, which can be programmed as a client or as a server. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications layer and an operating system. These can include executable and/or interpretable software programs or libraries, including tools and services of a 3D modeling and simulation program 404, such as described above, which uses a dual lattice representation for dynamic crash simulation and manufacturing. The number of software modules used can vary from one implementation to another. Moreover, the software modules can be distributed on one or more data processing apparatus connected by one or more computer networks or other suitable communication networks.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses its communication interface 418 to communicate with one or more computers 490, for example, over a network 480. Examples of user interface devices 420 include a display, a camera, a speaker, a microphone, a tactile feedback device, a keyboard, and a mouse. The data processing apparatus 400 can store instructions that implement operations associated with the program(s) described above, for example, on the computer readable medium 416 or one or more additional devices 414, for example, one or more of a hard disk device, an optical disk device, a tape device, and a solid state memory device.

Figure 5:
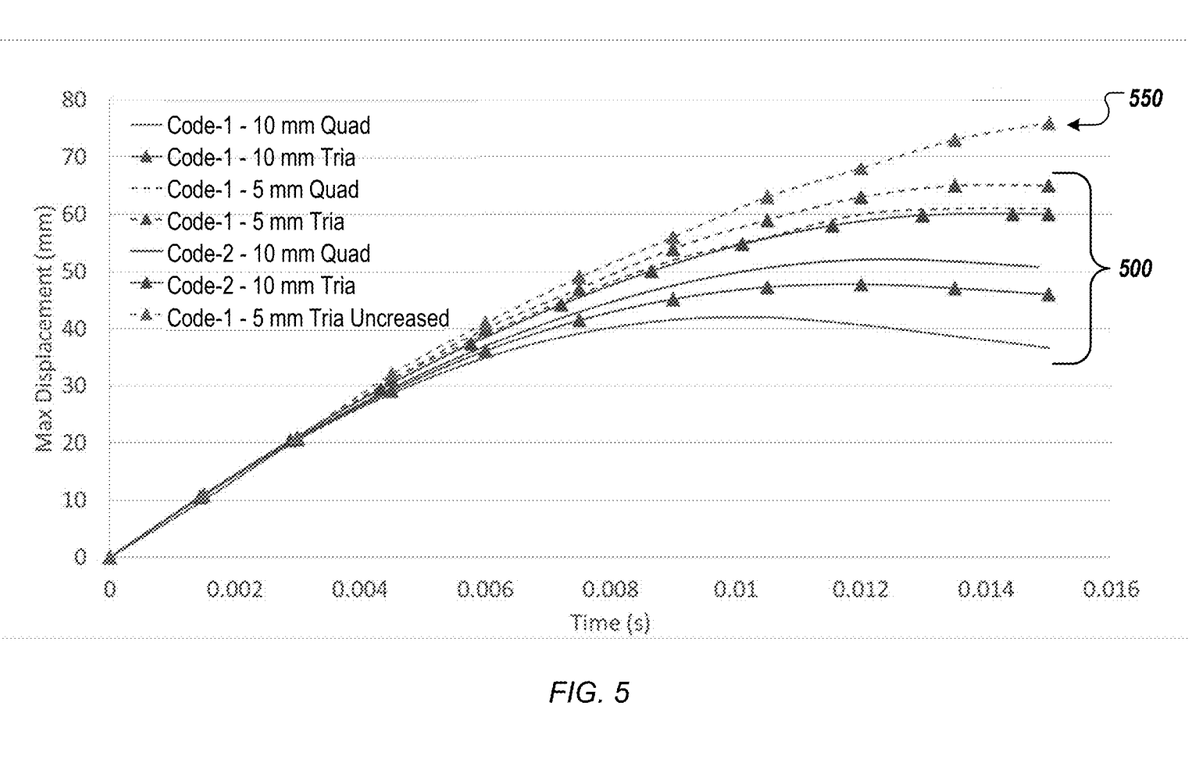
FIG. 5 shows data from numerical simulations done using different simplified representations of a lattice structure, similar to that shown in FIG. 3A.

FIG. 5 shows data from numerical simulations done using different simplified representations of a lattice structure, similar to that shown in FIG. 3A. The lattice structure used for this testing had 110 mm cube dimension, with 30 mm cell spacing. The different simplified representations included 10 mm and 5 mm Quad mesh representations and Tria mesh representations, and also an uncreased (organic) lattice model with round beams forming the lattice. The load setup for FEA numerical simulation was a 7.5 m/s displacement in the Z direction of a 12 kg load, with an X-Y plane translation constraint, and two different FEA numerical simulation programs (Code-1 and Code-2) were used to analyze the structural response of the different models of the lattice structure.

As shown, all the simplified representations of the lattice structure had less maximum displacement 500 than the maximum displacement 550 of the uncreased (organic) lattice model with round beams (composed of Tria mesh). This is a results of the increased inertia of rectangular beam sections. Also, the Tria mesh models yield higher deformation compared to Quad mesh models due to higher number of elements counts. Further, Code-1 and Code-2 generate different displacement curves using the same types of models, e.g., Code-2 exhibits softer behavior (more displacement over time) than Code-1 for the 10 mm Quad representation. Nonetheless, as shown in FIG. 5, the differences in performance are predictable and thus can be quantified and modeled for use in defining correlation factors between physical objects and the simplified representations used during numerical simulation (e.g., the correlation between a low poly quad dominant shell mesh model of a lattice structure and the solid body model of the lattice structure can be quantified and used to effectively eliminate any significant differences between the structural response simulated using the low poly quad dominant shell mesh model and the actual structural response of the lattice structure).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
   obtaining a skeleton model of a lattice structure to be included in a three dimensional model of a physical object to be manufactured, the skeleton model comprising nodes and lines representing beams of the lattice structure;
   constructing a control point frame surface model of the lattice structure using the skeleton model;
   generating a shell mesh model of the lattice structure using the control point frame surface model, wherein the shell mesh model corresponds to hollow versions of the beams of the lattice structure;
   performing dynamic numerical simulation of the physical object, using the shell mesh model included within the three dimensional model of the physical object, to produce a current numerical assessment;
   modifying the skeleton model or the control point frame surface model based on the current numerical assessment to change the lattice structure;
   repeating the constructing, the generating and the performing, or the generating and the performing, one or more times until the numerical simulation indicates the lattice structure satisfies at least one impact response requirement for the physical object;
   producing from the control point frame surface model a solid body model of the lattice structure in which the beams are hollow; and
   providing at least the solid body model for use in manufacturing a hollow lattice structure, which corresponds to the solid body model, for the physical object using one or more computer-controlled manufacturing systems.

2. The method of claim 1, wherein the generating comprises generating a midsurface shell mesh model of the lattice structure using the control point frame surface model and a specified thickness for the hollow versions of the beams of the lattice structure, the performing comprises performing the dynamic numerical simulation using the midsurface shell mesh model, and the producing comprises producing the solid body model of the lattice structure in which the beams are hollow and have the specified thickness.

3. The method of claim 1, wherein the generating comprises generating a low poly quad dominant shell mesh model of the lattice structure using the control point frame surface model, and the performing comprises performing the dynamic numerical simulation using the low poly quad dominant shell mesh model and empirical data indicating correlation between the low poly quad dominant shell mesh model of the lattice structure and the solid body model of the lattice structure.

4. The method of claim 3, wherein the empirical data is selected from a database of correlations in accordance with one or more properties of the lattice structure, wherein the correlations are of actual-to-simulated physical responses determined empirically for different lattice properties comprising lattice beam diameter, lattice thickness, lattice material, lattice cell size, lattice volume fraction, and lattice deformation.

5. The method of claim 1, wherein obtaining the skeleton model comprises:
calling a lattice design tool; and
receiving in, or producing from, output of the lattice design tool the nodes and the lines representing the beams of the lattice structure.

6. The method of claim 5, wherein the lattice design tool comprises a lattice optimization tool that determines one or more lattice characteristics based on static numerical simulation of a lattice component under one or more predefined loads, wherein the one or more lattice characteristics comprise lattice topology, lattice orientation, lattice cell size, lattice volume fraction, or a combination thereof.

7. The method of claim 1, wherein the skeleton model of the lattice structure further comprises thickness values and gradient values for the beams represented by the lines.

8. The method of claim 1, wherein the control point frame surface model comprises a T-Spline model of the lattice structure.

9. The method of claim 1, wherein the one or more computer-controlled manufacturing systems comprises one or more computer-controlled additive manufacturing systems, and the providing comprises:
generating toolpath specifications for the one or more computer-controlled additive manufacturing systems using at least the solid body model; and
manufacturing at least the lattice structure with the one or more computer-controlled additive manufacturing systems using the toolpath specifications generated for the one or more computer-controlled additive manufacturing systems.

10. A non-transitory computer-readable medium encoding instructions operable to cause data processing apparatus to perform operations comprising:
obtaining a skeleton model of a lattice structure to be included in a three dimensional model of a physical object to be manufactured, the skeleton model comprising nodes and lines representing beams of the lattice structure;
constructing a control point frame surface model of the lattice structure using the skeleton model;
generating a shell mesh model of the lattice structure using the control point frame surface model, wherein the shell mesh model corresponds to hollow versions of the beams of the lattice structure;
performing dynamic numerical simulation of the physical object, using the shell mesh model included within the three dimensional model of the physical object, to produce a current numerical assessment;
modifying the skeleton model or the control point frame surface model based on the current numerical assessment to change the lattice structure;
repeating the constructing, the generating and the performing, or the generating and the performing, one or more times until the numerical simulation indicates the lattice structure satisfies at least one impact response requirement for the physical object;
producing from the control point frame surface model a solid body model of the lattice structure in which the beams are hollow; and
providing at least the solid body model for use in manufacturing a hollow lattice structure, which corresponds to the solid body model, for the physical object using one or more computer-controlled manufacturing systems.

11. The non-transitory computer-readable medium of claim 10, wherein the generating comprises generating a midsurface shell mesh model of the lattice structure using the control point frame surface model and a specified thickness for the hollow versions of the beams of the lattice structure, the performing comprises performing the dynamic numerical simulation using the midsurface shell mesh model, and the producing comprises producing the solid body model of the lattice structure in which the beams are hollow and have the specified thickness.

12. The non-transitory computer-readable medium of claim 10, wherein the generating comprises generating a low poly quad dominant shell mesh model of the lattice structure using the control point frame surface model, and the performing comprises performing the dynamic numerical simulation using the low poly quad dominant shell mesh model and empirical data indicating correlation between the low poly quad dominant shell mesh model of the lattice structure and the solid body model of the lattice structure.

13. The non-transitory computer-readable medium of claim 10, wherein obtaining the skeleton model comprises:
calling a lattice design tool; and
receiving in, or producing from, output of the lattice design tool the nodes and the lines representing the beams of the lattice structure.

14. The non-transitory computer-readable medium of claim 10, wherein the skeleton model of the lattice structure further comprises thickness values and gradient values for the beams represented by the lines.

15. A system comprising:
a non-transitory storage medium having instructions of a computer aided design program stored thereon; and
one or more data processing apparatus able to run the instructions of the computer aided design program to perform operations specified by the instructions of the computer aided design program to
obtain a skeleton model of a lattice structure to be included in a three dimensional model of a physical object to be manufactured, the skeleton model comprising nodes and lines representing beams of the lattice structure,
construct a control point frame surface model of the lattice structure using the skeleton model,
generate a shell mesh model of the lattice structure using the control point frame surface model, wherein the shell mesh model corresponds to hollow versions of the beams of the lattice structure,
perform dynamic numerical simulation of the physical object, using the shell mesh model included within the three dimensional model of the physical object, to produce a current numerical assessment, modify the skeleton model or the control point frame surface model based on the current numerical assessment to change the lattice structure, repeat the control point frame surface model construction, the shell mesh model generation and the dynamic numerical simulation performance, or the shell mesh model generation and the dynamic numerical simulation performance, one or more times until the numerical simulation indicates the lattice structure satisfies at least one impact response requirement for the physical object, produce from the control point frame surface model a solid body model of the lattice structure in which the beams are hollow, and provide at least the solid body model for use in manufacturing a hollow lattice structure, which corresponds to the solid body model, for the physical object using one or more computer-controlled manufacturing systems.

16. The system of claim 15, wherein the one or more data processing apparatus are able to run the instructions of the computer aided design program to generate a midsurface shell mesh model of the lattice structure using the control point frame surface model and a specified thickness for the hollow versions of the beams of the lattice structure, perform the dynamic numerical simulation using the midsurface shell mesh model, and produce the solid body model of the lattice structure in which the beams are hollow and have the specified thickness.

17. The system of claim 15, wherein the one or more data processing apparatus are able to run the instructions of the computer aided design program to generate a low poly quad dominant shell mesh model of the lattice structure using the control point frame surface model, and perform the dynamic numerical simulation using the low poly quad dominant shell mesh model and empirical data indicating correlation between the low poly quad dominant shell mesh model of the lattice structure and the solid body model of the lattice structure.

18. The system of claim 15, wherein the one or more data processing apparatus are able to run the instructions of the computer aided design program to:

call a lattice design tool; and receive in, or produce from, output of the lattice design tool the nodes and the lines representing the beams of the lattice structure.

19. The system of claim 15, wherein the skeleton model of the lattice structure further comprises thickness values and gradient values for the beams represented by the lines.

20. The system of claim 15, comprising the one or more computer-controlled manufacturing systems comprising one or more computer-controlled additive manufacturing systems, wherein the one or more data processing apparatus are able to run the instructions of the computer aided design program to generate toolpath specifications for the one or more computer-controlled additive manufacturing systems using at least the solid body model, and to manufacture at least the lattice structure with the one or more computer-controlled additive manufacturing systems using the toolpath specifications generated for the one or more computer-controlled additive manufacturing systems.

21. The system of claim 17, wherein the empirical data is selected from a database of correlations in accordance with one or more properties of the lattice structure, wherein the correlations are of actual-to-simulated physical responses determined empirically for different lattice properties comprising lattice beam diameter, lattice thickness, lattice material, lattice cell size, lattice volume fraction, and lattice deformation.

22. The system of claim 18, wherein the lattice design tool comprises a lattice optimization tool that determines one or more lattice characteristics based on static numerical simulation of a lattice component under one or more predefined loads, wherein the one or more lattice characteristics comprise lattice topology, lattice orientation, lattice cell size, lattice volume fraction, or a combination thereof.

23. The system of claim 15, wherein the control point frame surface model comprises a T-Spline model of the lattice structure.

24. The non-transitory computer-readable medium of claim 12, wherein the empirical data is selected from a database of correlations in accordance with one or more properties of the lattice structure, wherein the correlations are of actual-to-simulated physical responses determined empirically for different lattice properties comprising lattice beam diameter, lattice thickness, lattice material, lattice cell size, lattice volume fraction, and lattice deformation.

25. The non-transitory computer-readable medium of claim 13, wherein the lattice design tool comprises a lattice optimization tool that determines one or more lattice characteristics based on static numerical simulation of a lattice component under one or more predefined loads, wherein the one or more lattice characteristics comprise lattice topology, lattice orientation, lattice cell size, lattice volume fraction, or a combination thereof.

26. The non-transitory computer-readable medium of claim 10, wherein the control point frame surface model comprises a T-Spline model of the lattice structure.

27. The non-transitory computer-readable medium of claim 10, wherein the one or more computer-controlled manufacturing systems comprises one or more computer-controlled additive manufacturing systems, and the providing comprises:

generating toolpath specifications for the one or more computer-controlled additive manufacturing systems using at least the solid body model; and manufacturing at least the lattice structure with the one or more computer-controlled additive manufacturing systems using the toolpath specifications generated for the one or more computer-controlled additive manufacturing systems.

* * * * *